No. 627,451. Patented June 20, 1899.
M. A. BAKER.
BICYCLE SADDLE SUPPORT.
(Application filed July 22, 1898.)

(No Model.)

WITNESSES.
J. C. des Granges.
C. B. Olds

INVENTOR
Milo A Baker
by Hazard & Harpham
his Attorneys.

UNITED STATES PATENT OFFICE.

MILO ARNETT BAKER, OF LOS ANGELES, CALIFORNIA.

BICYCLE SADDLE-SUPPORT.

SPECIFICATION forming part of Letters Patent No. 627,451, dated June 20, 1899.

Application filed July 22, 1898. Serial No. 686,594. (No model.)

*To all whom it may concern:*

Be it known that I, MILO ARNETT BAKER, a citizen of the United States, residing at Los Angeles, in the county of Los Angeles and State of California, have invented certain new and useful Improvements in Bicycle Saddle-Supports, whereby the inclination of the seat may be easily and conveniently changed at the will of the rider and without necessitating his dismounting, this latter being the special feature of my invention, which consists in the combinations of devices herein described, illustrated in the accompanying drawings, and more specifically pointed out in the claims hereto appended.

Figure 2:
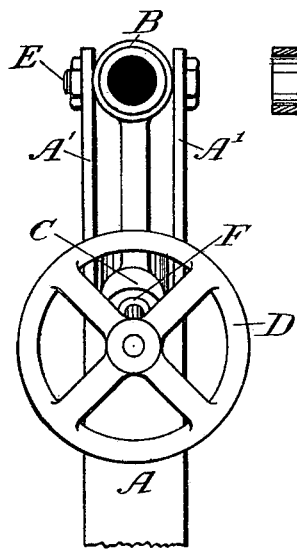
Figure 1:
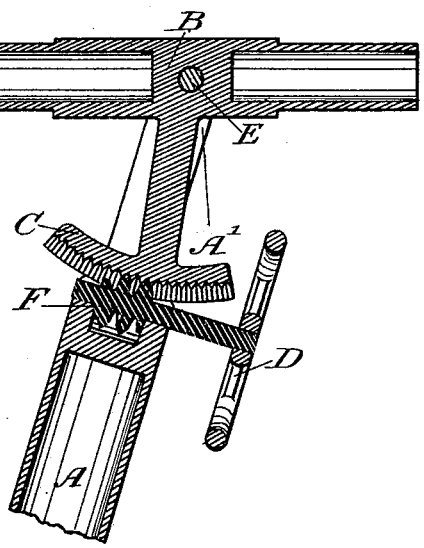

Referring to the accompanying drawings, Figure 1 is a central longitudinal section of a bicycle saddle-post and seat-support, and Fig. 2 is a rear elevation thereof.

A represents the saddle-post, which is bifurcated at its upper portion, as shown, forming arms A' A'.

B represents the saddle-bar, which is loosely pivoted on a bolt E near and between the upper extremities of these arms, the lower end of this saddle-bar being provided with a wormed segment or sector C, which may be formed integral therewith.

At the bases of and between the arms A' A' the saddle-post is provided with journal-bearings and shoulders. The stem F rests in these bearings and is formed with a worm of a length equal to the internal bore or diameter of the saddle-post and a diameter greater than that of the stem itself. Thus its longitudinal movement in the journals is prevented. The stem F meshes with the sector C and is thereby retained in its journals at all times. On the outer end of the stem I provide a hand-wheel D, by means of which the adjustment of the saddle may be easily and quickly effected.

Having thus described my invention, what I claim as new is—

1. The combination of a bifurcated saddle-post, a saddle-support provided with a cogged sector and pivoted and arranged between the arms of the saddle-post and a wormed stem also between the arms of the saddle-post and meshing with the sector, as and for the purpose described.

2. The combination with a bifurcated saddle-post, of a saddle-support provided with a worm-sector and pivoted between the arms of the saddle-post, a wormed stem located also between the arms of the saddle-post and meshing with the sector, the worm portion of the stem being restricted longitudinally by opposing shoulders formed on the saddle-post, all as and for the purpose set forth.

3. The combination with a saddle-support having a wormed sector integral therewith of a bifurcated saddle-post provided with journal-bearings between the arms thereof, and a wormed stem resting in said journals, said sector arranged also between the arms of the saddle-post and meshing with the wormed portion of the stem, all constructed and adapted to operate as and for the purpose set forth.

4. In a bicycle, the combination of a hollow seat-post having its upper end bifurcated and formed with open journal-bearings at the bases of and between the bifurcations, and a stem resting in said journal-bearings and provided with a worm intermediate the bearings, said worm being in length coincident with the internal diameter of the seat-post and of larger diameter than the stem so as to prevent longitudinal movement thereof in said journals; with a saddle-support pivoted between the bifurcations and having a depending worm-sector meshing with the said worm, for the purpose and substantially as described.

5. In a bicycle, the combination of a seat-post having a bifurcated upper end, and open journal-bearings intermediate the bifurcations, and a saddle-support pivoted between the bifurcations and provided with a worm-segment depending between the bifurcations; with a worm-shaft journaled in said bearings and prevented from moving longitudinally by the worm thereon, and kept in its journals by the said segment meshing therewith, said shaft being provided with a handpiece for rotating it, substantially as described.

In witness that I claim the foregoing I have hereunto subscribed my name, this 16th day of July, 1898, at Los Angeles, California.

MILO ARNETT BAKER.

Witnesses:
HENRY T. HAZARD,
G. E. HARPHAM.